(12) United States Patent
Ellner (10) Patent No.: US 9,386,273 B1
(45) Date of Patent: *Jul. 5, 2016

(54) VIDEO MULTICAST ENGINE

(71) Applicant: Google Inc., Mountain View, CA (US)

(72) Inventor: Lars Henrik Ellner, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,051

(22) Filed: Jul. 25, 2014

Related U.S. Application Data

(63) Continuation of application No. 13/534,400, filed on Jun. 27, 2012, now Pat. No. 8,791,982.

(51) Int. Cl.
*H04N 7/14* (2006.01)
*H04N 7/15* (2006.01)
*H04M 3/56* (2006.01)
*H04L 29/06* (2006.01)

(52) U.S. Cl.
CPC .............. *H04N 7/15* (2013.01); *H04L 65/403* (2013.01); *H04L 65/4076* (2013.01); *H04M 3/563* (2013.01)

(58) Field of Classification Search
CPC ... H04M 3/563; H04L 65/4076; H04L 65/403
USPC ......................................... 348/14.1; 370/260
See application file for complete search history.

(56) References Cited

U.S. PATENT DOCUMENTS

| | | |
|---|---|---|
| 3,381,273 A | 4/1968 | Stark et al. |
| 5,778,082 A | 7/1998 | Chu et al. |
| 5,801,756 A | 9/1998 | Iizawa |
| 5,914,949 A | 6/1999 | Li |
| 5,936,662 A | 8/1999 | Kim et al. |

(Continued)

FOREIGN PATENT DOCUMENTS

| | | |
|---|---|---|
| EP | 1578116 | 9/2005 |
| WO | WO9611457 | 4/1996 |

(Continued)

OTHER PUBLICATIONS

Babonneau, et al., "SSRC Multiplexing for Unicast and Multicast RTP Sessions," Network Working Group Internet-Draft (IETF Trust 2010).

(Continued)

*Primary Examiner* — Creighton Smith
(74) *Attorney, Agent, or Firm* — Young Basile Hanlon & MacFarlane, P.C.

(57) ABSTRACT

Introduction of one or more multicast engines to a video conferencing system permits an improvement of overall network bandwidth used for a video conference. Video streams are received at a multicast engine from each of at least two participants in the video conference. The multicast engine transmits only the first of the two video streams based on a determination that only the first video stream is a candidate for a conference video stream to be transmitted to at least some of a plurality of conference participants from the server station. The conference video stream is received at the multicast engine from the server station, and the stream is transmitted from the multicast engine to each of the participants in the video conference that are connected to the multicast engine.

20 Claims, 4 Drawing Sheets

(56) References Cited

U.S. PATENT DOCUMENTS

| | | |
|---|---|---|
| 5,953,050 A | 9/1999 | Kamata et al. |
| 5,963,547 A | 10/1999 | O'Neil et al. |
| 6,011,868 A | 1/2000 | van den Branden et al. |
| 6,028,639 A | 2/2000 | Bhatt et al. |
| 6,072,522 A | 6/2000 | Ippolito et al. |
| 6,163,335 A | 12/2000 | Barraclough |
| 6,453,336 B1 | 9/2002 | Beyda et al. |
| 6,580,754 B1 | 6/2003 | Wan et al. |
| 6,603,501 B1 | 8/2003 | Parry et al. |
| 6,614,936 B1 | 9/2003 | Wu et al. |
| 6,621,514 B1 | 9/2003 | Hamilton |
| 6,658,618 B1 | 12/2003 | Gu et al. |
| 6,757,259 B1 | 6/2004 | Hamilton |
| 6,775,247 B1 | 8/2004 | Shaffer et al. |
| 6,795,863 B1 | 9/2004 | Doty, Jr. |
| 6,941,021 B2 | 9/2005 | Goldstein et al. |
| 6,992,692 B2 | 1/2006 | Gu et al. |
| 7,007,098 B1 | 2/2006 | Smyth et al. |
| 7,084,898 B1 | 8/2006 | Firestone et al. |
| 7,123,696 B2 | 10/2006 | Lowe |
| 7,133,362 B2 | 11/2006 | Chu et al. |
| 7,137,074 B1 | 11/2006 | Newton et al. |
| 7,143,432 B1 | 11/2006 | Brooks et al. |
| 7,206,016 B2 | 4/2007 | Gu |
| 7,253,831 B2 | 8/2007 | Gu |
| 7,321,384 B1 | 1/2008 | Wu et al. |
| 7,349,944 B2 | 3/2008 | Vernon et al. |
| 7,352,808 B2 | 4/2008 | Ratakonda et al. |
| 7,477,282 B2 | 1/2009 | Firestone et al. |
| 7,558,221 B2 | 7/2009 | Nelson et al. |
| 7,593,031 B2 | 9/2009 | Root et al. |
| 7,619,645 B2 | 11/2009 | Cockerton |
| 7,627,886 B2 | 12/2009 | Barbanson et al. |
| 7,640,507 B2 | 12/2009 | Bedingfield, Sr. |
| 7,646,736 B2 | 1/2010 | Yang et al. |
| 7,664,057 B1 | 2/2010 | Wu et al. |
| 7,692,683 B2 | 4/2010 | Kenoyer et al. |
| 7,698,724 B1 | 4/2010 | Day |
| 7,707,247 B2 | 4/2010 | Dunn et al. |
| 7,716,283 B2 | 5/2010 | Thukral |
| 7,759,756 B2 | 7/2010 | Lee et al. |
| 7,856,093 B2 | 12/2010 | Fujimori et al. |
| 7,864,251 B2 | 1/2011 | Gu et al. |
| RE42,288 E | 4/2011 | Degioanni |
| 7,920,158 B1 | 4/2011 | Beck et al. |
| 7,932,920 B2 | 4/2011 | Lia et al. |
| 7,973,857 B2 | 7/2011 | Ahmaniemi et al. |
| 7,987,492 B2 | 7/2011 | Liwerant et al. |
| 8,010,652 B2 | 8/2011 | Wang et al. |
| 8,060,608 B2 | 11/2011 | Wang et al. |
| 8,117,638 B2 | 2/2012 | Perlman |
| 8,164,618 B2 | 4/2012 | Yang et al. |
| 8,228,982 B2 | 7/2012 | Qian et al. |
| 8,264,521 B2 | 9/2012 | Triplicane et al. |
| 8,265,168 B1 | 9/2012 | Masterson et al. |
| 8,276,195 B2 | 9/2012 | Hegde et al. |
| 8,325,825 B2 | 12/2012 | Schelstraete et al. |
| 8,462,856 B2 | 6/2013 | Eleftheriadis et al. |
| 8,527,649 B2 | 9/2013 | Wexler et al. |
| 8,549,571 B2 | 10/2013 | Loher et al. |
| 8,588,280 B2 | 11/2013 | Oh et al. |
| 8,749,612 B1 | 6/2014 | Ellner et al. |
| 8,797,378 B1 | 8/2014 | Holmer |
| 8,917,309 B1 | 12/2014 | Westin |
| 2001/0042114 A1 | 11/2001 | Agraharam et al. |
| 2002/0033880 A1 | 3/2002 | Sul et al. |
| 2002/0118272 A1 | 8/2002 | Bruce-Smith |
| 2003/0091000 A1 | 5/2003 | Chu et al. |
| 2003/0123545 A1 | 7/2003 | Prakash et al. |
| 2003/0160862 A1 | 8/2003 | Charlier et al. |
| 2004/0119814 A1 | 6/2004 | Clisham et al. |
| 2005/0008240 A1 | 1/2005 | Banerji et al. |
| 2005/0062843 A1 | 3/2005 | Bowers et al. |
| 2005/0140779 A1 | 6/2005 | Schulz et al. |
| 2006/0023644 A1 | 2/2006 | Jang et al. |
| 2006/0164552 A1 | 7/2006 | Cutler |
| 2007/0005804 A1 | 1/2007 | Rideout |
| 2007/0035819 A1 | 2/2007 | Bahatt et al. |
| 2007/0081794 A1 | 4/2007 | Baynger et al. |
| 2007/0120971 A1 | 5/2007 | Kennedy |
| 2007/0127671 A1 | 6/2007 | Chua et al. |
| 2007/0200923 A1 | 8/2007 | Eleftheriadis et al. |
| 2007/0206091 A1 | 9/2007 | Dunn et al. |
| 2007/0280194 A1 | 12/2007 | Wu et al. |
| 2007/0294346 A1 | 12/2007 | Moore et al. |
| 2008/0008398 A1 | 1/2008 | Tanaka et al. |
| 2008/0025398 A1 | 1/2008 | Molloy et al. |
| 2008/0218582 A1 | 9/2008 | Buckler |
| 2008/0246834 A1 | 10/2008 | Lunde et al. |
| 2008/0267282 A1 | 10/2008 | Kalipatnapu et al. |
| 2008/0316297 A1 | 12/2008 | King et al. |
| 2009/0045987 A1 | 2/2009 | Cho et al. |
| 2009/0079811 A1 | 3/2009 | Brandt |
| 2009/0164575 A1 | 6/2009 | Barbeau et al. |
| 2009/0174764 A1 | 7/2009 | Chadha et al. |
| 2010/0091086 A1 | 4/2010 | Hagen |
| 2010/0141655 A1 | 6/2010 | Belinsky et al. |
| 2010/0271457 A1 | 10/2010 | Thapa |
| 2010/0302446 A1 | 12/2010 | Mauchly et al. |
| 2011/0018962 A1 | 1/2011 | Lin et al. |
| 2011/0040562 A1 | 2/2011 | Doyle et al. |
| 2011/0074910 A1 | 3/2011 | King et al. |
| 2011/0074913 A1 | 3/2011 | Kulkarni et al. |
| 2011/0131144 A1 | 6/2011 | Ashour et al. |
| 2011/0141221 A1 | 6/2011 | Satterlee et al. |
| 2011/0205332 A1 | 8/2011 | Jeong et al. |
| 2011/0206113 A1 | 8/2011 | Bivolarsky et al. |
| 2011/0310217 A1 | 12/2011 | Lee et al. |
| 2012/0098923 A1 | 4/2012 | Westin |
| 2012/0327172 A1 | 12/2012 | El-Saban et al. |
| 2013/0088600 A1 | 4/2013 | Wu et al. |
| 2013/0111051 A1 | 5/2013 | Yaron et al. |
| 2013/0176383 A1 | 7/2013 | Satterlee et al. |
| 2013/0290494 A1* | 10/2013 | Goudarzi et al. ............ 709/219 |
| 2013/0346564 A1 | 12/2013 | Warrick et al. |
| 2014/0125755 A1 | 5/2014 | Thomas |
| 2014/0267560 A1 | 9/2014 | Bright-Thomas |

FOREIGN PATENT DOCUMENTS

| | | |
|---|---|---|
| WO | WO2008066593 | 6/2008 |
| WO | WO2010059481 | 5/2010 |
| WO | WO2010111275 | 9/2010 |
| WO | WO2011150128 | 12/2011 |

OTHER PUBLICATIONS

EP Search Report for EP Application No. 10188901.2 dated Jun. 9, 2011.
Bankoski et al. "Technical Overview of VP8, An Open Source Video Codec for the Web". Dated Jul. 11, 2011.
Bankoski et al. "VP8 Data Format and Decoding Guide; draft-bankoski-vp8-bitstream-02" Network Working Group. Internet-Draft, May 18, 2011, 288 pp.
Chung R H Y et al. "Efficient Block-Based Motion Segmentation Method using Motion Vector Consistency"; Proceedings of the Ninth Conference on Machine Vision Application: Tsukuba Science City, Japan; May 16-18, 2005.
Cisco WebEx, "Share Ideas With Anyone, Anywhere—Online", Cisco WebEx Meeting Center, Product Overview, 2011 (2 pp).
Cisco, "Cisco TelePresence Product Portfolio", Brochure, 2011 (5 pp).
Firestone, S., et al. "Lip Synchronization in Video Conferencing." Voice and Video Conferencing Fundamentals. Cisco Systems, Inc. Mar. 2007.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Mozilla, "Introduction to Video Coding Part 1: Transform Coding", Video Compression Overview, Mar. 2012, 171 pp.

(56) References Cited

OTHER PUBLICATIONS

Overview; VP7 Data Format and Decoder. Version 1.5. On2 Technologies, Inc. Dated Mar. 28, 2005.
Park, Jun Sung, et al., "Selective Intra Prediction Mode Decision for H.264/AVC Encoders", World Academy of Science, Engineering and Technology 13, (2006).
Schulzrinne, H., et al. RTP: A Transport Protocol for Real-Time Applications, RFC 3550. The Internet Society. Jul. 2003.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Sun Y et al, Asynchronous Rate Control for Multi-Object Videos, IEEE Transactions on Circuits and Systems for Video Technology, Aug. 1, 2005, pp. 1007-1018, vol. 15, No. 8 [retrieved from Internet on Jul. 19, 2011] <URL: http://ieeexplore.ieee.org/stamp/stamp.jsp?tp=&arnumber=1490554>.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.

\* cited by examiner

VIDEO MULTICAST ENGINE

CROSS-REFERENCE TO RELATED APPLICATION

This application is a continuation of U.S. patent application Ser. No. 13/534,400, filed Jun. 27, 2012, the entire content of which is incorporated herein in its entirety by reference.

TECHNICAL FIELD

The present invention relates in general to video conferencing and more particularly to a video multicast engine for video conferencing systems.

BACKGROUND

Digital video streams typically represent video using a sequence of frames (i.e., still images). An increasing number of applications today make use of digital video stream encoding for purposes other than traditional moving pictures (such as movies and video clips). For example, video conferencing applications generally format one or more video sources and other digital information for display on a monitor and transmit the formatted data as a digital video stream, irrespective of the specialized nature of the video sources or digital information displayed. Similar video encoding algorithms are often used. However, when sending traditional moving pictures over a network, it generally doesn't matter when the video stream is generated or that it is not real-time. This fact can be taken advantage of by the service provider. The service provider can, for example, pre-encode a whole movie to save central processing unit (CPU) cycles since the same pre-encoded stream can be sent to anyone who wants to see the same movie. In addition, buffering on the client side can occur before playing a movie to compensate for bursty networks and allow for loss-less transport protocols. In video conferencing applications, these things cannot be done due to the real-time nature of video conferencing. In general, even a delay of a couple of seconds degrades the video conferencing experience.

SUMMARY

Herein, embodiments of an apparatus for and method of conducting a video conference with reduced bandwidth usage are taught. One method comprises, by example, receiving a video stream at a multicast engine connected to a participant of a plurality of participants in the video conference, the video stream being supplied by the participant, the multicast engine including a first memory and a first processor configured to execute instructions stored in the first memory, selectively transmitting the video stream of the participant from the multicast engine to a server station (e.g., a video mixer or video conference server) based on a determination of whether the video stream is a candidate for a conference video stream to be transmitted to at least some of the plurality of participants from the server station, the server station including a second memory and a second processor configured to execute instructions stored in the second memory, receiving the conference video stream at the multicast engine from the server station, and transmitting the conference video stream to any participants in the video conference that are connected to the multicast engine.

Another method described herein includes receiving, at a first processor of a multicast engine, at least a first video stream and a second video stream respectively supplied from each of at least two participants in a video conference that are connected to an input of the multicast engine, of the first video stream and the second video stream, transmitting only the first video stream to a server station from the multicast engine based on a determination that only the first video stream is a candidate for a conference video stream to be transmitted to at least some of a plurality of conference participants from the server station, the server station including a second memory and a second processor configured to execute instructions stored in the second memory, receiving at least one video stream forming the conference video stream from the server station, and transmitting the conference video stream to each of the at least two participants in the video conference that are connected to the multicast engine.

One aspect of an apparatus for conducting a video conference with reduced bandwidth usage comprises a multicast engine including a first memory and a first processor The first processor is configured to execute instructions stored in the first memory to receive a video stream supplied from a participant of a plurality of participants in the video conference, selectively transmit the video stream of the participant to a server station based on a determination of whether the video stream is a candidate for a conference video stream to be transmitted to at least some of the plurality of participants from the server station, the server station including a second memory and a second processor configured to execute instructions stored in the second memory, receive the conference video stream from the server station, and transmit the conference video stream to any participants in the video conference that are connected to the multicast engine.

Another apparatus described herein is a multicast engine. The multicast engine includes a first memory and a first processor. In one implementation, the multicast engine is configured to execute instructions stored in the first memory to receive at least a first video stream and a second video stream respectively supplied from each of at least two participants in a video conference that are connected to an input of the multicast engine, of the first video stream and the second video stream, transmit only the first video stream to a server station based on a determination that only the first video stream is a candidate for a conference video stream to be transmitted to at least some of a plurality of conference participants from the server station, the server station including a second memory and a second processor configured to execute instructions stored in the second memory, receive at least one video stream forming the conference video stream from the server station, and transmit the conference video stream to each of the at least two participants in the video conference that are connected to the multicast engine.

Variations of these methods and apparatuses and details of other aspects and embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Video conferencing systems typically use video encoding and decoding technology to acquire video stream data from two or more client systems over a network, format it into a display which may contain multiple video streams and other data and transmit the formatted display data over a network as a video stream to the clients. This processing is performed in close to real time to provide the video conferencing participants with a simulation of having an in-person meeting that is as realistic as possible. The quality of the transmitted video and the real time performance of the video conferencing system are dependent upon, among other things, available network bandwidth. Where the number of participants exceeds the number of concurrently mixed streams of the conference stream, significant bandwidth is expended sending video streams to the server generating the conference stream that are not needed. Unlike audio streams, where the unmixed streams are often monitored to determine their voice activity, the unmixed video streams are not otherwise used.

One configuration for video conferencing involves a group of clients that are close to each other communicating with at least one other group of close clients where the groups themselves are more distant from each other than the clients are from each other. This distance is generally, although not necessarily, a geographic distance. For example, a company may have two or more locations on separate continents. Each location has multiple clients in close proximity geographically, possibly in the same building or on the same campus, but the locations are widely separated. In this scenario, the mixer (also called a video conference server) is generally more distant from all but one of the client groups. Network performance is proportional to the distance the network has to transmit data. The longer the distance the data has to be transmitted, the more likely errors will be introduced. Further, the effective network bandwidth can be reduced due to increased error correction overhead.

Taught herein are ways to use more efficiently the available network bandwidth for video conferencing in situations where groups of clients are communicating over relatively large distances. Embodiments of a video multicast engine, for example, limit the transmission and re-transmission of video, and optionally audio, streams over such large distances.

Figure 1:
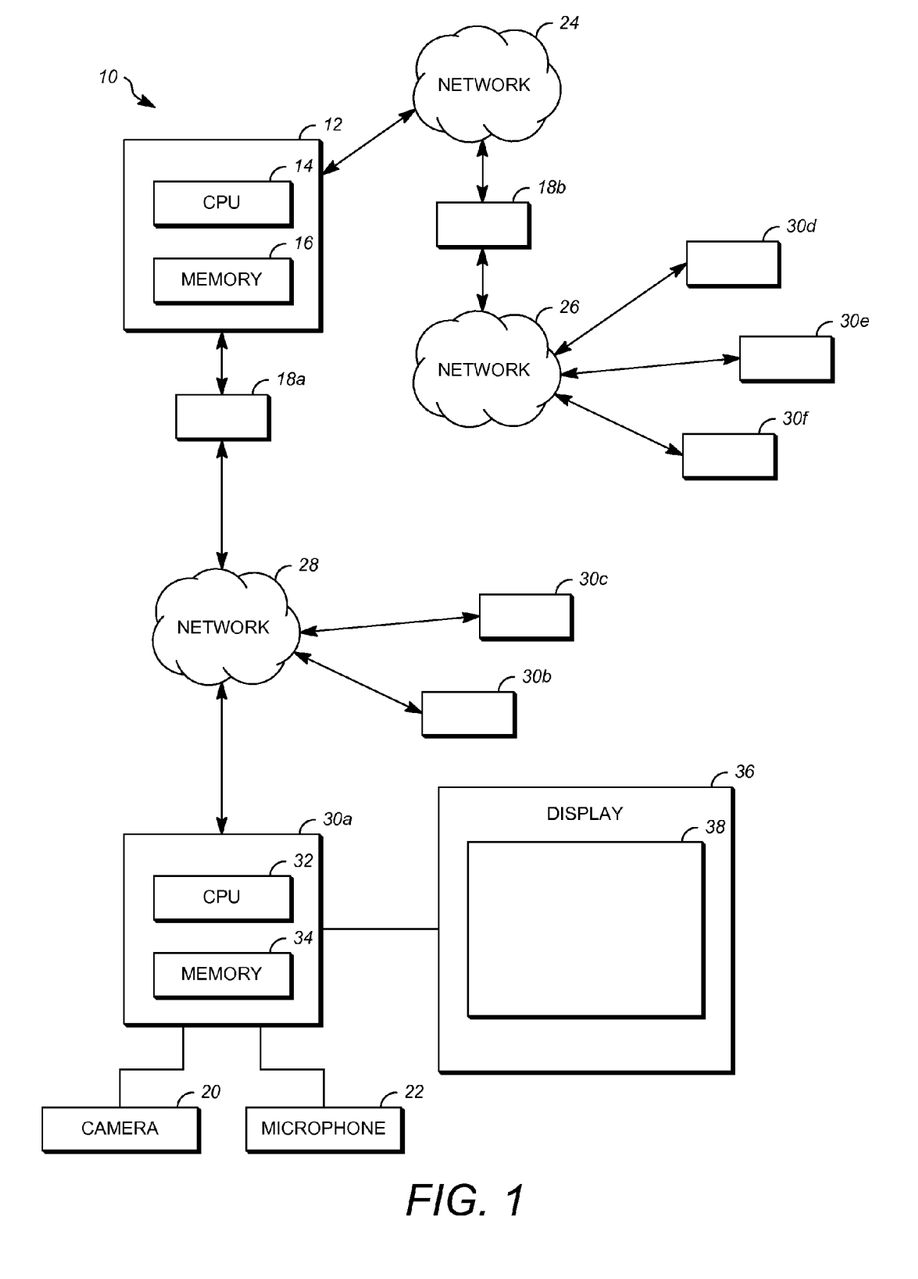
FIG. 1 is a diagram of a video conferencing system in which embodiments of the present invention can be implemented.

FIG. 1 is a diagram of a video conferencing system 10 in which embodiments of the present invention can be implemented. An exemplary video conference server or first station 12 can be, for example, a computer having an internal configuration of hardware including a processor such as a central processing unit (CPU) 14 and a memory 16. CPU 14 can be a controller controlling the operations of the transmitting station 12. CPU 14 is connected to memory 16 by, for example, a memory bus (not shown). Memory 16 can be read-only memory (ROM), random access memory (RAM) or any other suitable memory device. Memory 16 stores data and program instructions that are used by CPU 14. Other suitable implementations of server 12 are possible. For example, the processing of server 12 can be distributed among multiple devices.

Server 12 is connected to a plurality of clients or second stations 30a-f (collectively, clients 30 hereinafter). Server 12 is connected to clients 30a-c through a network 28, and server 12 is connected to clients 30d-f through networks 24 and 26. A multicast engine 18 is located with each group, or cluster, of clients. In the example shown in FIG. 1, one multicast engine 18a is located with a first client cluster comprising clients 30a-c such that multicast engine 18a is connected to network 28, which connects clients 30a-c to each other, and to server 12. Another multicast engine 18b is located with a second client cluster comprising clients 30d-f such that multicast engine 18b is connected to network 26, which connects clients 30d-f to each other, and to network 24, which connects to server 12.

Although a direct connection from multicast engine 18a to server 12 is shown such that server 12 is connected to network 28 through multicast engine 18a, server 12 can be connected to network 28 such that communications between server 12 and multicast engine 18a pass through network 28. Moreover, multicast engine 18a and server 12 can be connected by another network similar to network 24.

Each multicast engine 18 has an internal configuration including a CPU and a memory in a similar way as does server 12. Accordingly, the internal configurations of multicast engines 18a, 18b are not shown in FIG. 1 for simplicity.

Generally, server 12 can collect video and voice streams from clients 30 through multicast engine 18a and/or multicast engine 18b and transmits at least one of the video streams as a conference video stream and at least one of the voice streams as a conference voice stream back to one or more of clients 30 through multicast engine 18a and/or multicast engine 18b. The video streams are generally encoded for transmission over network 28 or networks 24, 26 by whichever station is transmitting a video stream and are decoded upon receipt by whichever station is acting as a receiving station.

At least one of networks 24, 26 and 28 can be, for example, the Internet. Networks 24, 26, 28 can also be a local area network (LAN), wide area network (WAN), virtual private network (VPN), cellular phone network and/or any other means of transferring the video stream between and among server 12, multicast engines 18 and clients 30. In an example, network 24 and network 28 are each the same type of network, such as a LAN, while network 26 is the Internet. Other arrangements are possible. Multicast engine 18b can be the same or a similar distance away from clients 30d-f as multicast engine 18a is from clients 30a-c in an example, while one of multicast engines 18a, 18b (and hence its related client cluster) can be more distant from server 12 than the other. Distance herein can mean geographical distance as mentioned above and/or can mean a network distance. When discussing network distance, for example, the characteristics of the path of data transfer over networks 24, 26, 28 and clients 30a-f can be implicated. In one embodiment, for example, the first client cluster that includes multicast engine 18a could be the same or a similar geographical distance from server 12 as the second client cluster that includes multicast engine 18b, but the characteristics of the data path from server 12 to clients 30a-c and that from server 12 to clients 30d-f could mean that transmission from server 12 to clients 30a-c takes longer than transmission from server 12 to clients 30d-f.

Note that although server 12 is described as collecting video streams from clients 30 through multicast engines 18 and generating the conference video stream as a mixed signal for transmission back to one or more of clients 30, server 12 can also act as a relay server rather than a mixer. When server 12 acts as a relay server, the image(s) of the stream are composited by clients 30 based on unmixed ingress streams as discussed in additional detail hereinafter. Also, when server 12 acts as a relay server, multicast engines 18 also relay those unmixed streams for clients 30 to mix in one implementation. In another, multicast engines 18 may perform the mixing for each client.

Client 30a, in one example, can be a computer having an internal configuration of hardware including a processor such as a CPU 32 and a memory 34. Although only the configuration of client 30a is shown, each of clients 30 can be generally of the same configuration. CPU 32 can be a controller controlling the operations of client 30a. CPU 32 is connected to memory 34 by, for example, a memory bus (not shown). Memory 34 can be ROM, RAM or any other suitable memory device. Memory 34 stores data and program instructions that are used by CPU 32. Other suitable implementations of clients 30 are possible. For example, the processing of each client 30a-f can be distributed among multiple devices.

At least one of clients 30 can include a camera 20 to capture a video stream to be transmitted to server 12 and optionally a microphone 22 to capture an audio stream to be transmitted to server 12. Camera 20 can be of any type such as an ordinary webcam, a conference room pan-tilt-zoom (PTZ) camera, a high-definition (HD) camera or a personal computer (PC) or laptop built-in camera. Microphone 22 can be any standard microphone.

In FIG. 1, a display 36 configured to display video streams can be connected to client 30a. Clients 30b-f generally can also include display 36. In some implementations, clients 30 each include display 36. Display 36 can be implemented in various ways, including by a liquid crystal display (LCD) or a cathode-ray tube (CRT) or light emitting diode (LED) display, such as an OLED display. Display 36 is coupled to CPU 32 and can be configured to display a decoded, mixed video stream 38 at clients 30.

Other implementations of video conferencing system 10 are possible. For example, one or more of clients 30 could omit camera 20 and/or display 36. Optionally, a video source and/or an audio source from a client 30 can be one or more files stored in memory 34 that are played during the video conference. In another implementation, additional components can be added to video conferencing system 10. For example, a video camera can be attached to server 12 to capture another video stream to be included in the conference video stream, and a display can optionally be added to server 12 to display a video stream.

Multicast engines 18 can have a structure similar to client 30a. For example, multicast engine 18 can be a computer having an internal configuration of hardware including a processor such as a CPU and a memory. The CPU can be a controller controlling the operations of multicast engine 18 that is connected to the memory by, for example, a memory bus (not shown). The memory can be ROM, RAM or any other suitable memory device that stores data and program instructions that are used by the CPU. Multicast engine 18 does not have to include a display or camera, but multicast engine 18 can include these components.

In an exemplary implementation described herein, the real-time transport protocol (RTP) is used to transmit encoded bitstreams over networks 24, 26, 28. Thus, the described embodiment refers to the control protocol (RTCP) for RTP. Another transport protocol can optionally be used instead of RTP. In an implementation, any out-of-band signaling scheme may be used for transmission of state information related to an encoded bitstream. For example, a NACK signal as described herein can be replaced with an out-of-band signaling scheme.

In some implementations of a video conferencing system 10, server 12 is relatively more distant from all client clusters except one. In these and other implementations, multicast engine 18 can be used to reduce bandwidth usage of video conferencing system 10. In an arbitrary example, a multinational corporation has a location in Europe and in the US, i.e., there are two groups that are relatively distant from each other. When a video conference is held between the two offices where all participants/clients are participating in a single conference from their computers, the clients within the same group are very close to each other (maybe even on the same internal network) and are of a large number. If the conference server (e.g., server 12) is located in the US, all the clients in Europe will have to send their individual streams to the server in the absence of multicast engine 18.

In one example of a multicast engine 18, each multicast engine 18 is transparent to the remaining elements of video conferencing system 10 in the sense that the interface between multicast engine 18 and its respective clients 30 and server 12 is designed to be substantially identical to any pre-existing interface between clients 30 and server 12. Therefore, multicast engine 18 may be beneficially inserted into an existing video conferencing system containing an appropriately configured server, clients and networks without requiring changes in the operation of the existing elements. That is, clients 30 and server 12 do not need to know that they are interfacing with a multicast engine 18. Instead, they could be modified to address the multicast engine 18 without a change in operation. In other embodiments, a change in operation of server 12 and/or clients 30 could be implemented with the inclusion of one or more multicast engines 18.

Certain embodiments of multicast engine 18 are described with reference to multicast engine 18a. However, the operations described are equally applicable to multicast engine 18b or any other number of multicast engines where the multicast engines are placed based on the characteristics of the network. In general, multicast engines 18 can reduce required network bandwidth over networks 24, 26 and/or 28 by selecting a subset of the input video streams from its client cluster for re-transmission to server 12, thereby reducing the bandwidth requirements. The input video stream(s) selected by a multicast engine 18 and sent to server 12 are called candidates or candidate streams, as they are selected as possible streams for the conference video stream.

Figure 2:
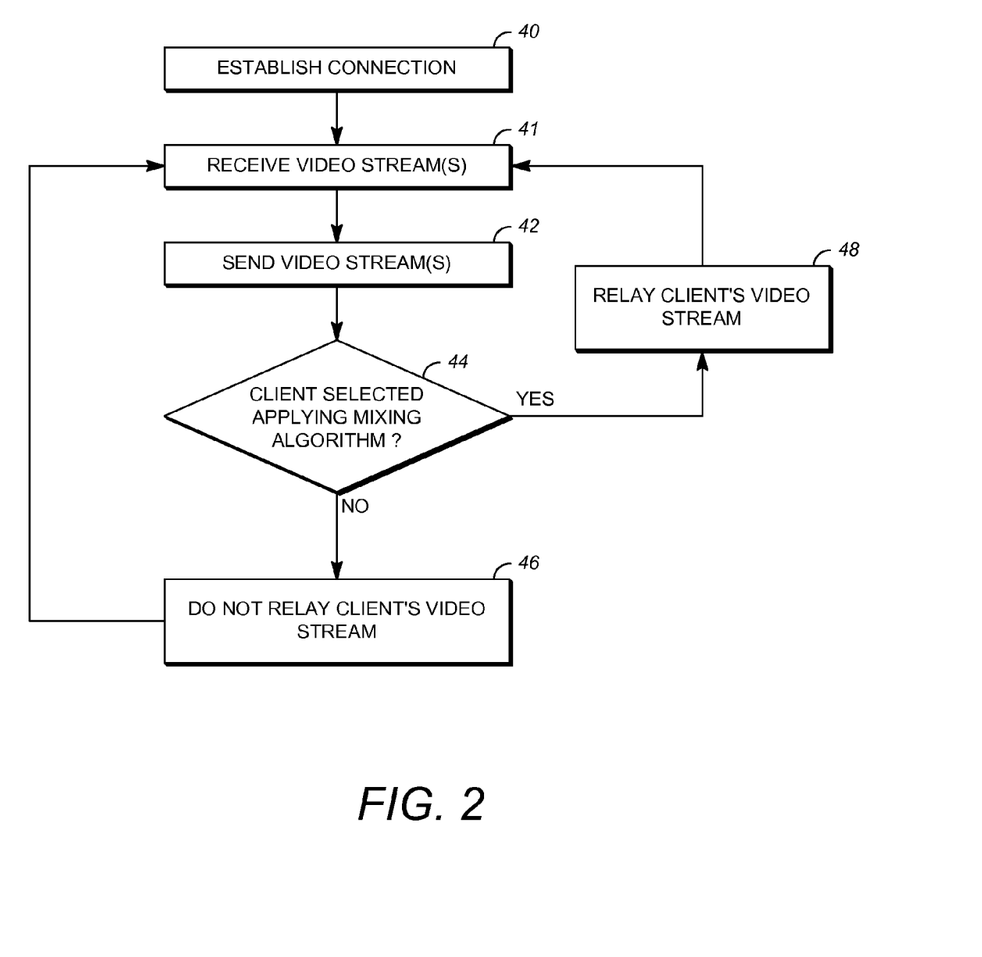
FIG. 2 is a flowchart illustrating a process of selecting candidate video streams by a multicast engine according to an embodiment.

FIG. 2 is a flowchart illustrating a process of selecting candidate video streams by a multicast engine according to an embodiment. More specifically, a multicast engine establishes a connection to clients within its cluster and to the device (e.g., a server) that will be selecting streams for the video mixing and determines whether and which candidate video streams are to be re-transmitted. This multicast engine also transmits the mixed video stream or those of the video streams to be mixed to its connected clients. In this example, and in response to any one or more of clients 30a-c establishing a connection to it, multicast engine 18a (MCE 18a) establishes a connection to server 12 in step 40, which performs the video selection according to a pre-defined mixing algorithm. The pre-defined mixing algorithm can be any known algorithm that selects which video streams from participants to a video conference are used to create a conference video stream for the participants. For example, several known mixing algorithms base the selection of video streams on voice activity, either momentary or over a time interval extending into the past. Generally, the voice activity can be ranked, and the video streams of those participants with the highest level of activity are used to form the conference video stream. Once MCE 18a is connected to a client or clients, MCE 18a receives a video stream, if any, from each connected client and receives the conference video stream from server 12 in step 41. In this example, the initial description is based on the scenario where server 12 also mixes selected streams based on the mixing algorithm to generate the conference video stream as a mixed video stream. In other scenarios discussed hereinafter, the conference video stream comprises those video streams selected by the mixing algorithm, but clients 30 perform the mixing using these separate streams.

When the mixing algorithm or scheme used by server 12 is deterministic, MCE 18a can itself also estimate or predict if its received video streams may be part of the mix (i.e., is a candidate video stream). In one example, MCE 18a begins sending the conference video stream it receives from server 12 to any connected clients in step 42. MCE 18a can also begin sending or relaying the video streams it receives from connected clients to server 12 in step 42, although this is not necessary initially and can await the first application of a mixing algorithm by MCE 18a. MCE 18a applies or performs the mixing algorithm in step 44 to determine whether a connected client 30a, 30b or 30c is a candidate for selection when server 12 performs its mixing algorithm. Note that this example describes MCE 18a as receiving video and optionally audio signals from a single client 30a at a time for simplicity. However, this is not intended to exclude a situation where MCE 18a receives streams from more than one of clients 30a-c. In such an arrangement, the steps of FIG. 2 starting in step 44 are performed continuously in either a sequential or parallel manner for each connected client 30. Each connected client 30 can connect or disconnect at any time while MCE 18a is connected to server 12.

At least two different examples of implementing the mixing algorithm at step 44 are explained herein. In each example, each MCE 18 performs the same mixing algorithm (i.e., uses the same selection criteria) as server 12. In one implementation, a connected MCE 18 uses the streams of its connected clients 30 as inputs to select candidate video streams to transmit to server 12 without reference to other possible input streams. In another implementation, a connected MCE 18 uses other information, including for example signals from server 12, to possibly further reduce the number of candidate streams relayed to server 12.

Broadly stated, in an implementation where MCE 18a makes the decision in step 44 based only on data associated with its connected clients, a predefined maximum number of streams to be sent from MCE 18a can be set based on the number of streams that server 12 will select from all participants (i.e., from all connected clients 30). For example, if m is the number of clients to be included in the conference video stream from server 12, the number of streams from MCE 18a could be limited to m. In this example, server 12 may generate m+1 unique streams—one for each participant being mixed and one for everyone else, and server 12 will send back one stream for each received stream. If the streams selected by the same MCE 18a are all mixed, sending m streams means that the MCE has access to the m unique mixed streams but not the stream for everyone else. Note that this applies to the mixing case. When relaying, sending m streams from server 12 is sufficient since all streams are available to MCE 18a. Additionally, if server 12 sends the same mixed stream, it is also sufficient for MCE 18a to send only m streams. In this case, all but one client stream could be set up as send-only to save bandwidth between MCE 18a and server 12. In another implementation, the m+1th stream from server 12 could be registered as a listen only stream to save bandwidth.

As mentioned, in this implementation, MCE 18a performs its mixing algorithm to select which of its input streams to relay to server 12 (e.g., up to m streams). If a client's video stream is identified or selected in this selection process in step 44, the client's video stream is a candidate for mixing when server 12 performs its own algorithm to select video streams for the conference video stream. Accordingly, the client's video stream can start or continue to be relayed in the processing of step 48 when MCE 18a selects the client in step 44 or the client's video stream can be stopped or prevented from being relayed in step 46 when MCE 18a does not select the client in step 44. Clients connected to MCE 18a whose video streams are not selected in step 44 are excluded as candidates to server 12 on the premise that a participant's stream would not be selected by server 12 if it is not selected by MCE 18a. Note that in this example, all incoming streams could be selected by MCE 18a when N, the number of incoming streams to MCE 18a, is equal to or less than m. This means that an individual client can always be selected as a candidate to be relayed to server 12 even if that client is very unlikely to be selected by server 12 as part of the conference video stream. In alternative implementations where data received from other than its connected clients can be used by MCE 18a to select and relay candidate video streams, the maximum number of streams that can be relayed can be similarly limited to m video streams, but MCE 18a may relay no video streams to server 12 as candidates in response to the query of step 44 where considering the additional data leads MCE 18a to conclude that none of its incoming video streams are likely to be selected by server 12.

Step 44 is explained in more detail by reference to a specific mixing algorithm—in this example, US 2009/0322854 A1, which is assigned to the Assignee of the present invention and is incorporated herein in its entirety by reference. An embodiment of that disclosure is summarized next for convenience. The deterministic methods taught therein base the selection decision on the momentary voice activity of the participants, including clients 30a-c, for example. However, the selection decision observes constraints that improve stability of the image(s) seen by each participant, decrease flickering of the image(s), choose comfortable and helpful swapping times between different image configurations and reflect the importance attributed to sources having a higher accumulated voice activity in a natural conference. One way this is done is by use of, among other variables, a voice activity detection (VAD) that is a stream of binary values representing voice activity from an input audio signal over a number of time intervals. Generally, a current VAD is used to select an input video stream that is used for the outgoing conference stream and to unselect another input video stream so it is not used for the outgoing conference stream unless doing so would violate an imposed constraint. For example, a steadiness constraint prevents a selected input from being unselected and an unselected input from being selected for a certain number of consecutive VADs. An anti-flickering constraint stipulates that the total number of input signals changing status between two consecutive VADs is limited to a predetermined number. A preference constraint is based on an accumulated voice activity, which is a moving average, a recursive relation or a multi-linear function or weighted average of the most recent VADs in an exemplary embodiment.

In this example, MCE 18a receives voice streams from each of its connected clients in step 41 in addition to video streams and in step 44 MCE 18a determines whether a particular client, such as client 30a, is a candidate for the conference video stream according to the mixing algorithm. Certain variables needed to perform the entire algorithm may be unknown to MCE 18 through signal loss or for other reasons. For example, MCE 18a may not receive the VADs for each input signal (i.e., from each participant) in the mixing algorithm described above. In another example, MCE 18a does not receive video and audio streams from clients 30*d-f*. As a result, MCE 18*a* will use a combination of known parameters (such as those obtained from the received audio signals of its client cluster) and approximate values for unknown parameters, if any.

Values for the unknown parameters are desirably biased so that MCE 18*a* relays the video stream of a particular client if there is any chance that server 12 may decide to use that stream for mixing. For example, where the mixing algorithm above is used, MCE 18*a* continues to send a client's video stream if there is any selection of the unknown parameters for the mixing algorithm (e.g., how long time since the last positive VAD for another participant) that would result in the video stream of client 30 being selected for mixing. Network delay is the time for which at least some state information is unknown so MCE 18*a* may need to estimate the state for this time frame. The estimate can, in a conservative scenario, be biased towards values that would result in MCE 18*a* having to send at least one video stream. This could be done in one example by estimating the VAD during the time frame to be negative for all participants for which MCE 18*a* does not receive input.

The number of unknown parameters can be reduced in an embodiment where feedback from server 12 is used. In this example, when RTP is used for transmission, server 12 transmits RTP packets to MCE 18*a* where every packet has an RTP header. Each RTP header contains a (synchronization source) SSRC identifier and may contain a contributing source (CSRC) list. A CRSC list identifies the contributing sources for the payload of a mixed RTP packet by including the SSRC identifiers of the streams mixed to form the payload. Each participant to the video conference has a unique SSRC identifier, including client 30*a*, and by examining the CSRC list, MCE 18*a* can obtain feedback to deduce values for some of the unknown parameters. According to one use of feedback, if client 30*a* will only be mixed in the next mixing cycle if it was selected previously by server 12 and client 30*a* is not mixed according to the CSRC list, MCE 18*a* can assume that client 30*a* will not be mixed and does not send it to server 12 as a candidate. Note that if the CSRC list or other feedback is used, the network delay is desirably taken into account.

The foregoing generally assumes that in making the decision in step 44, MCU 18*a* decides to send a video stream of client 30*a* if there is any chance that server 12 may decide to use that video stream in the conference video stream. In some embodiments it may be beneficial to relax this condition, e.g., by applying a heuristic technique, to prevent more streams from being relayed from MCE 18*a* to server 12 when they will not be mixed at the cost of some video streams from participants not being relayed to server 12 even though they would have been selected by server 12. If the condition is relaxed in this manner, the mixing algorithm performed at server 12 could be extended or additional subsequent decision-making could be added so as to handle not receiving video from a would-be-mixed client. One way of doing this could be to select only the streams from clients 30 that should be mixed and from which a video stream is received, thereby omitting streams not received at server 12. Another way is by ranking all clients 30 based on the mixing algorithm and picking the top N (where N is the number of participants to mix) from which a video stream is being received to form the conference video stream, thus replacing a missing video stream with one that is received. Server 12 could also disregard any clients 30 from which no video stream is received at the time the mixing decision is initially made. This could be done by not considering the audio stream from such clients 30 when performing the mixing algorithm, for example.

Regardless of how the mixing algorithm is applied in step 44, processing advances to step 46 to stop sending/relaying the video stream from client 30*a* to server 12 or to continue not to send/relay the video stream from client 30*a* to server 12 if MCE 18*a* determines that the video stream of client 30*a* is not a candidate (e.g., it is not selected in step 44) and returns to step 41. Otherwise, MCE 18*a* continues to send or starts to send the video stream of client 30*a* in step 48 and returns to step 41 so that the mixing algorithm of step 44 is repeated on, for example, a periodic basis conforming to the mixing cycle of server 12.

The same process used to perform the determination in step 44 can be used for each pass. Alternatively, the same mixing algorithm can be used, but conditions can be applied differently depending on whether the client 30*a* was relayed in a previous cycle or not. For example, some values for unknown parameters can be biased so that MCE 18*a* sends the video stream of client 30*a* if there is any chance that server 12 may decide to use that stream for the conference video stream when MCE 18*a* is already sending the video stream of client 30*a* in step 44, but can be biased so that MCE 18*a* does not send the video stream of client 30*a* unless server 12 will more likely than not decide to use that stream for the conference video stream when MCE 18*a* has stopped sending the video stream of client 30*a* in step 46.

Processing through steps 41-48 of FIG. 2 occurs continuously by MCE 18*a* until all its connected clients disconnect from the video conference. As mentioned above, clients 30*a-c* can continuously connect and disconnect from MCE 18*a* during the processing of FIG. 2.

Note that in this example, server 12 and clients 30 run without modifications to their normal operations. That is, clients 30 continuously send their video and optionally their audio streams to MCEs 18 like they would send them to server 12 in the absence of MCEs 18. Server 12 can perform its mixing algorithm and transmit the conference video stream to MCEs 18 without providing any additional inputs to MCEs 18. In one such example, server 12 receives incoming video streams and sends a conference video stream including those video streams selected by applying a mixing algorithm for the connected participants or clients 30. The conference video stream can be either a mixed stream or can include the selected streams for clients 30 to mix. Server 12 just may not receive streams from some of clients 30 during the video conference. That is, if MCEs 18 each operate according to the teachings herein, they can selectively discontinue sending video streams of their connected clients 30 to server 12.

Figure 3:
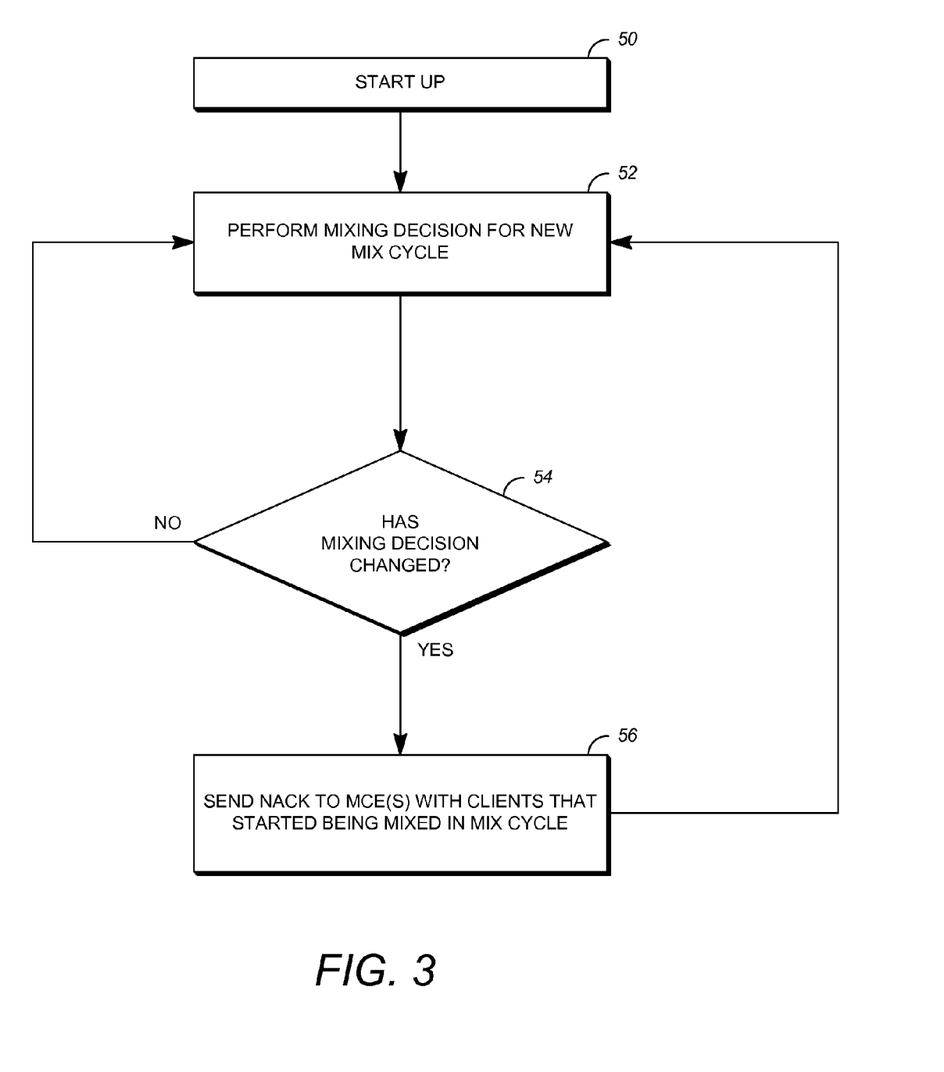
FIG. 3 is a flowchart illustrating a process of signaling between a multicast engine and a server according to another embodiment.
Figure 4:
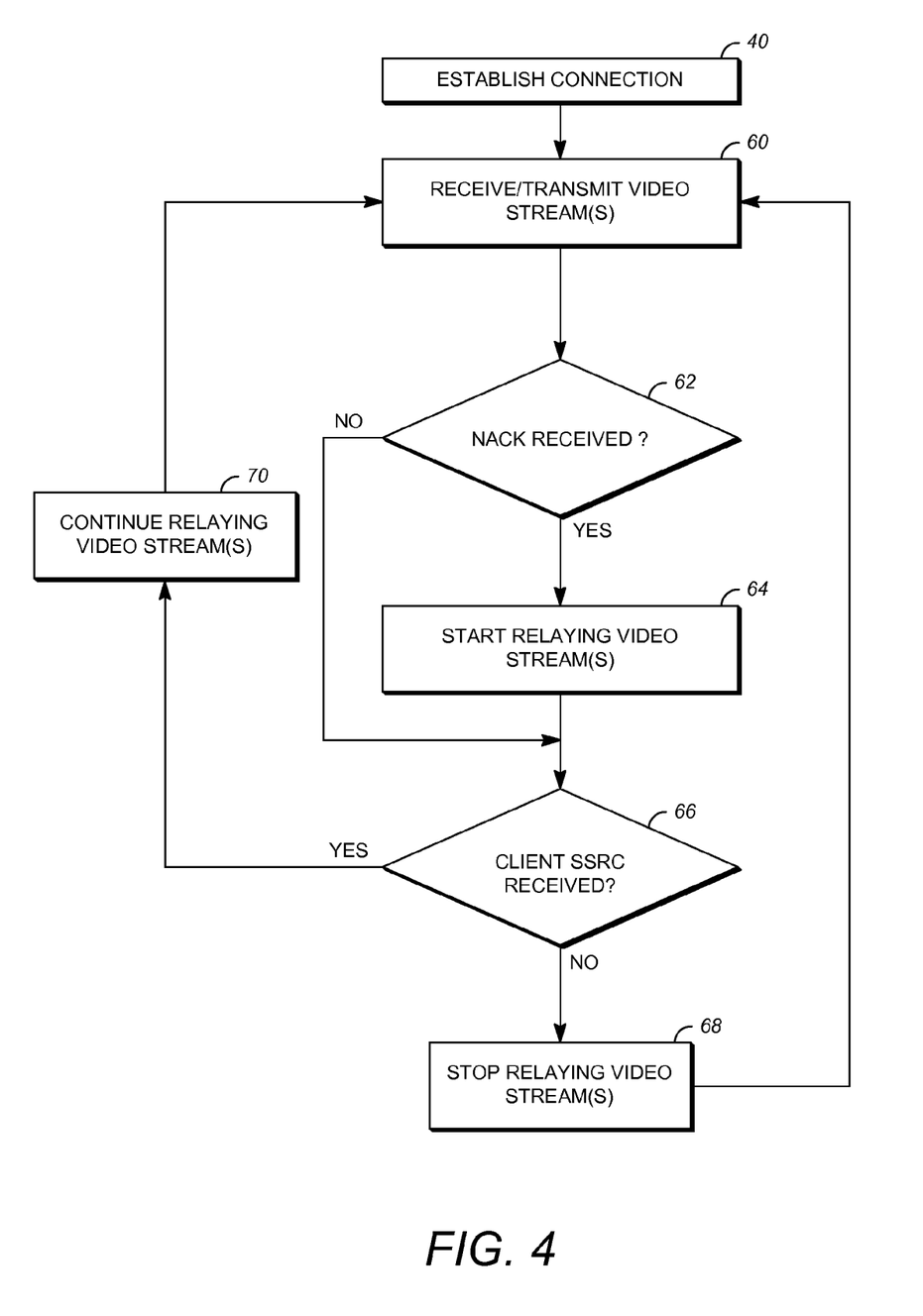
FIG. 4 is a flowchart illustrating a process of selecting candidate video streams by a multicast engine according to the embodiment of FIG. 3.

Another example implementing a multicast engine where clients 30 do not need to modify their operation is described with respect to FIGS. 3 and 4. FIG. 3 is a flowchart illustrating a process of signaling between a multicast engine and a server according to another embodiment, and FIG. 4 is a flowchart illustrating a process of selecting candidate video streams by a multicast engine according to the embodiment of FIG. 3. This embodiment is an example of a mode where server 12 provides additional inputs to MCEs 18. RTCP is used for signaling in this example. Note that certain steps in FIG. 4 are repetitive of those in FIG. 2 and are described only briefly below. Also, the example used again is based on MCE 18*a*, but the teachings can be equally applied to all MCEs 18, such as MCE 18*b*.

As shown in FIG. 3, server 12 starts up the video conference in step 50 by letting MCEs 18 connect and disconnect at their leisure. When connected, MCE 18*a* transmits audio or voice streams to server 12. Such streams may include voice data if a participant is using its microphone 22, but it could also include data representing silence if the participant is not speaking or has its microphone 22 muted. Over a plurality of cycles, server 12 performs a mixing algorithm for a new cycle in step 52 to decide which video streams of clients 30 should be included in the conference video stream. Generally, the mixing algorithm is performed periodically, but this is not necessary. Instead, performing a new cycle could be based on an event such as the addition or removal of a participant. Another possibility is manual intervention by a conference curator that manages the video conference or by an individual client. The mixing algorithm could be any known mixing algorithm. One exemplary mixing algorithm uses voice streams from clients 30 as described previously.

If the mixing algorithm results in the same decision regarding mixing as the last cycle in response to the query of step 54, processing returns to step 52 to perform the mixing algorithm to make a mixing decision in the next cycle. In contrast, if the mixing decision has changed, i.e., the output of the mixing algorithm indicates that at least one new video stream is to be included in the mixed conference video stream, processing advances from step 54 to step 56. In step 56, server 12 signals each MCE 18 connected to a client 30 whose stream was not mixed before but should be mixed in the new cycle. In this exemplary embodiment, a negative acknowledgement or not acknowledged (NACK) is used to signal that sending of a corresponding stream should be started or resumed. After the first iteration where server 12 sends the signal in step 56, server 12 forms the conference video stream using the selected video stream(s) and goes to step 52 to perform the mixing algorithm for the next cycle. Once server 12 begins transmitting the conference video stream, the processing of steps 52-56 is performed concurrently with that transmission until the end of the conference. As mentioned previously, the selected video stream(s) can be mixed by server 12 before being sent as conference video stream.

Clients 30 connect and disconnect to MCEs 18 for the video conference at their leisure. In the example of FIG. 4, MCE 18*a* establishes a connection to server 12 in step 40 according to known techniques once at least one client 30*a* establishes a connection to it. MCE 18*a* begins receiving video and optionally audio streams from any connected clients 30*a-c* and transmits the conference video stream to those connected clients 30*a-c* starting in step 60 and continues to do so as long as any client remains connected to MCE 18*a*. In next step 62, MCE 18*a* begins monitoring for receipt of the signal from server 12 sent in step 56 of FIG. 3, in this embodiment a NACK signal. When a signal is received in step 62, processing advances to step 64. Otherwise, processing can advance directly to step 66. In step 64, MCE 18*a* starts sending the video stream of any connected client to be included in the conference video stream in the next cycle to server 12 and continues this transmission until a client's video stream is no longer needed for the conference video stream. Note that although step 62 is indicated as part of the sequence in FIG. 4, a NACK signal is asynchronous and can be received any time during the synchronous mix cycle. Step 62 represents the relative timing of the query in the synchronous mix cycle.

After the start of relaying in step 64 (whether in the current cycle or in a previous cycle), processing advances to step 66 to determine whether to continue relaying streams. In one example, this check is made by reviewing the SSRC identifier of clients connected to MCE 18*a* in the RTP header of the video signal. More specifically, MCE 18*a* checks whether the SSRC identifier of its connected clients, such as client 30*a*, is received in step 66. In this particular example, when the RTP header received from server 12 does not include the SSRC identifier of a particular client in step 66, MCE 18*a* stops relaying the video stream of that client to server 12 in step 68.

Otherwise, the client or clients relayed in the previous cycle continue to be relayed in step 72. In either case, processing returns to step 60 to again monitor for the signal from server 12 indicating that the video stream of one of its connected clients is needed for the mixed conference video stream. Steps 60-70 are repeated while MCE 18*a* is connected to server 12. The SSRC identifiers, like the NACK signals, can be received asynchronously.

Although not shown in FIG. 4, until a NACK signal is first received in step 62, processing can immediately return to step 60 to monitor for a NACK signal because reviewing the SSRC identifiers in step 66 would not be needed unless MCE 18*a* is relaying video streams. In subsequent passes (i.e., after the initiation of relaying in step 64 in a previous cycle), failure to receive a new NACK signal indicating the need to start relaying a new video stream in step 62 can result in the processing advancing to step 66 as shown in FIG. 4 unless all client streams from MCE 18*a* to server 12 are discontinued in step 68 to determine whether to continue relaying as described above.

Note that the pace at which video from a client or participant can be mixed, stop being mixed and be mixed again may take a longer time than the network delay. Since changing the mixing configuration too often is perceived as jarring, server 12 may desirably avoid frequent changes by techniques such as those described in US 2009/0322854 A1.

In the description above, the conference video stream is described as being sent from server 12 to MCEs 18 and from there to respective clients 30. Note that the conference video stream sent to one client may not necessarily be the same as that sent to another client. As just one example, when client 30*a* is selected by the mixing algorithm, the conference video stream sent back to client 30*a* from MCE 18*a* can omit the video stream from client 30*a*. That is, MCE 18*a* can ensure that the information in the video stream of a client is never sent back to that client. In certain embodiments, client 30*a* could elect to never display a particular participant or may deny some clients permission to view its stream. Typically, these selections are made using an out-of-band signaling scheme, and the present teachings are not intended to prevent or modify such restrictions.

Further, the conference video stream is sometimes described as a mixed stream. This is intended to note that the conference video stream is formed by considering video streams from a number of participants over the course of the video conference. However, at any given time, the conference video stream can consist of only one source video stream. Moreover, the mixing algorithm could result in a conference video stream where only one source is selected for the entire video conference.

The description of the steps above is only by example. In the above description of FIG. 4, for example, MCE 18*a* initially relays a video stream only in response to a signal from server 12. Alternatively, MCE 18*a* could start relaying its clients' video streams in step 60 upon establishing the connection in step 40. Then, processing would continue as shown to determine which video streams to stop relaying or to continue relaying. Other variations are also possible.

In the examples of FIGS. 2-4, client 30*a* represents a single participant producing a single video stream from camera 20 to MCE 18*a*, which is then selectively transmitted to server 12. Client 30*a* then receives the conference video stream from server 12 through MCE 18*a*. In a conference call, there may be many client clusters, and hence multiple MCEs 18 interacting with server 12. In variations of the teachings herein, client 30*a* or MCE 18*a* could perform mixing where server 12 is not itself a mixer but is a relay server. In one example when server 12 is acting as a relay server rather than a mixer, the image(s) can be composited by clients 30 based on ingress streams. In this case, MCEs 18 would still determine which of the video streams of its connected clients 30 are candidates that may be mixed and transmit them to server 12. However, server 12 would then relay the video streams it selects for a mixed video stream to each connected MCE 18 for transmission to each connected client 30. Mixing is performed by each client 30 according to known techniques using the conference video stream (e.g., the selected video streams) they receive from an MCE 18.

Formation and transmittal of the conference video stream is described above with respect to FIGS. 2-4. In some implementations, the conference audio stream is generated separately from the conference video stream and is synchronized and concurrently transmitted from server 12. In other implementations, for example, there is no need to synchronize when RTP/RTCP streams contain the information needed by the client to synchronize. Any known method of mixing the conference audio stream from the plurality of audio streams received from the participants can be used.

According to one embodiment implementing an MCE 18 in video conferencing system 10, the conference video stream sent from server 12 to MCE 18 corresponds to the highest quality video stream used by the cluster of clients connected to MCE 18. MCE 18 can then transcode the stream to the video quality and encoding format required by a respective client 30 before sending the conference video stream to each client. This would make use of the fact that only one encoding is needed for the same video quality and encode format. In this way, MCE 18 could provide images of a different (e.g., lower) resolution to those of its connected clients requiring it. This has the benefit of decreasing the computational load of server 12 for scenarios where clients 30 require different encode formats and bitrates since server 12 only encodes once with a highest quality video codec and resolution.

Some of the embodiments described above improve bandwidth usage by both having clients send their video streams to a multicast engine instead of directly to the server and then by sending only one video stream to the multicast engine for transmission to its connected clients/participants. A different solution that asymmetrically improves bandwidth usage is possible whereby the clients directly send their video streams to the server, which in turn sends the conference video stream to the multicast engine for transmission to all clients/participants in that engine's cluster. Similar benefits would be obtained if the clients send their streams to the multicast engine, and the multicast engine sends all streams to the server.

The embodiments described above are able to address dynamic video selection. However, static video selection can be used with the teachings herein. For example, a subset of the video streams from clients 30 to be retransmitted to server 12 from a multicast engine 18*a*, 18*b* can be statically pre-selected, for example, with one or more of clients 30*a-f* designated as a full-function station capable of originating video stream data and receiving the formatted display. Other clients could be pre-selected to be partial-function stations, capable of receiving the formatted display but not capable of originating a video stream to be included in the video conference, for example. The selection could also be manual, but dynamic, where one or more of clients 30*a-f* are capable of communicating with MCEs 18 via networks 24, 26 and/or 28 and use this communication capability to direct MCEs 18 to select a particular subset of the video streams based on input from the clients. An example of this would be to provide each client with a switch that indicates that the particular client wishes to have their video stream included in the video conference, for example when a client wished to speak. When the particular client is done talking, the client could then request that their video stream be de-selected to free up bandwidth. In this scenario, server 12 would be signaled in the same way as MCEs 18.

Although the embodiments described generally use MCE 18 to determine which video signals to transmit, while server 12 receives all audio signals for mixing and transmission as one conference audio stream, this is not required. MCE 18 or another device, such as a voice multicast engine (VME) located similarly to each MCE 18, could be used for audio control. Such an implementation further reduces bandwidth by acknowledging that in some implementations only a few participants m are mixed (e.g., less than four), as described briefly above. The mixer (e.g., server 12) can transmit m+1 streams (one for each participant being mixed and one stream for everyone else). When more than one cluster occurs in video conferencing system 10, such as that shown by example in FIG. 1, m or fewer participants are to be mixed from each cluster. Each engine (MCE 18 or a VME) could use the same audio mixing algorithm as server 12 to determine which audio streams to discard before the audio streams are sent to server 12. In general, this process for the engine starts when the engine receives the audio streams from all connected clients 30 while storing the SSRC of each stream in a like manner as the video is received. The same mixing algorithm can be applied, and the selected streams can be relayed from each engine to server 12. The mixed m+1 streams are received at the engine where the m+1th stream contains the mixed stream of all participants/clients 30 selected by the mixing algorithm, and the other m streams contain mixed audio with one of the participants removed (e.g., to avoid feedback). For a stream received by the engine that has a CRSC count of m (that is, the number of SSRC identifiers in the CSRC list received by the engine is m), the engine can identify which, if any, of its connected clients 30 has a SSRC that matches one of the CSRC fields. For each such client, the engine relays the stream received from the mixer for which the SSRC is not in the CSRC field to that client. For all other connected clients 30, the m+1th stream is forwarded from the engine.

The engine can also be used where the server 12 is a relay server and not a mixer. Instead of performing all of the above steps, the engine would receive all streams from server 12. Then, the engine would relay each stream to a client for which an SSRC does not match the stored values from the connected clients 30. Note that if server 12 knows that a MCE 18 is relaying the conference video stream, server 12 only needs to send one stream back for each mixed participant since MCE 18 can reconstruct any combination of mixed streams from those streams. In another implementation where server 12 is a relay server, MCEs 18 may perform mixing for one or more clients 30, instead of those clients doing so. This can be beneficial for, e.g., mobile devices that have limited bandwidth and processing power.

The particular format of the digital video streams described herein is not limited. For example, the digital video streams can incorporate formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10). When using these formats, it is likely that MCE 18 will have to send what is conventionally called an I-frame when resuming transmission of any of its video streams in the steps described previously.

The embodiments of server 12, multicast engines 18 and clients 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. Further, portions of server 12, multicast engines 18 and clients 30 do not necessarily have to be implemented in the same manner.

Further, in one embodiment for example, server 12, each multicast engine 18a or 18b or each client 30a-f can be implemented using a general purpose computer/processor with a computer program that, when executed, carries out any of the respective methods, algorithms and/or instructions described herein. In addition or alternatively, for example, a special purpose computer/processor can be utilized that can contain hardware for carrying out any of the methods, algorithms, or instructions described herein.

All or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also possible.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The above-described embodiments have been described in order to allow easy understanding of the present invention and do not limit the present invention. On the contrary, the invention is intended to cover various modifications and equivalent arrangements included within the scope of the claims, which scope is to be accorded the broadest interpretation so as to encompass all such modifications and equivalent structure as is permitted under the law.

What is claimed is:

1. An apparatus, comprising:
a multicast engine, including:
a first memory; and
a first processor configured to execute instructions stored in the first memory to:
receive a plurality of video streams including at least a first video stream and a second video stream respectively supplied from each of at least two participants in a video conference that are connected to an input of the multicast engine;
transmit the first video stream to a server station while not transmitting the second video stream to the server station based on a determination that the first video stream and not the second video stream is a candidate for a conference video stream to be transmitted to at least some of a plurality of conference participants from the server station;
receive at least one video stream forming the conference video stream from the server station; and
transmit the conference video stream to each of the at least two participants in the video conference that are connected to the multicast engine.

2. The apparatus of claim 1, further comprising:
the first processor configured to execute instructions stored in the first memory to determine which of the at least two participants connected to the input of the multicast engine is a candidate for the conference video stream.

3. The apparatus of claim 1, further comprising:
the first processor configured to execute instructions stored in the first memory to determine which of the at least two participants connected to the input of the multicast engine is a candidate for the conference video stream by performing a mixing algorithm that selects the first video stream as the candidate for the conference video stream to be transmitted to the at least some of the plurality of conference participants from the server station.

4. The apparatus of claim 3, further comprising:
the mixing algorithm being a same mixing algorithm used by the server station to determine which video streams of the plurality of conference participants to include in the conference video stream.

5. The apparatus of claim 3, further comprising:
the server station being a relay station; and
the mixing algorithm being a same mixing algorithm used by the server station to determine which video streams of the plurality of conference participants to include in the conference video stream.

6. The apparatus of claim 1, further comprising:
the first processor configured to execute instructions stored in the first memory to mix the conference video stream before transmitting the conference video stream.

7. The apparatus of claim 1, further comprising:
the first processor configured to execute instructions stored in the first memory to
receive a signal from the server station indicating that the first video stream is the candidate for the conference video stream.

8. The apparatus of claim 1, further comprising:
a distance between each of the at least two participants in the video conference and the multicast engine being less than a distance between the multicast engine and the server station.

9. The apparatus of claim 1, further comprising:
the multicast engine being one of a plurality of multicast engines, each of the plurality of multicast engines connected to the server station and to different ones of the plurality of participants to form respective clusters; and all but at least one of the plurality of multicast engines is less distant from its connected participants than it is from the server station.

10. The apparatus of claim 1, further comprising:
the server station including a second memory and a second processor configured to execute instructions stored in the second memory to:
perform a mixing algorithm that determines which video streams of the plurality of participants to include in the conference video stream; and
transmit a signal to the multicast engine indicating those video streams supplied from each of the at least two participants to include in the conference video stream.

11. The apparatus of claim 1, further comprising:
the first processor configured to execute instructions stored in the first memory to:
transmit the first video stream and the second video stream, upon the multicast engine establishing a connection to the server station, to the server station; and
end transmission of the second video stream to the server station when a result of the determination indicates that the second video stream is not a candidate for the video conference stream.

12. The apparatus of claim 1, further comprising:
the first processor configured to execute instructions stored in the first memory to receive the at least one video stream forming the conference video stream by receiving the conference video stream;
an encoding format of the conference video stream received at the multicast engine corresponds to that of a highest quality video stream of the at least two participants connected to the multicast engine; and
the first processor configured to execute instructions stored in the first memory to transcode the conference video stream to an encoding format required by a respective connected client before transmitting the conference video stream to each of the at least two participants in the video conference that are connected to the multicast engine.

13. A method, comprising:
receiving, at a first processor of a multicast engine, at least a first video stream and a second video stream respectively supplied from each of at least two participants in a video conference that are connected to an input of the multicast engine;
of the first video stream and the second video stream, transmitting only the first video stream to a server station from the multicast engine based on a determination that only the first video stream is a candidate for a conference video stream to be transmitted to at least some of a plurality of conference participants from the server station, the server station including a second memory and a second processor configured to execute instructions stored in the second memory;
receiving at least one video stream forming the conference video stream from the server station; and
transmitting the conference video stream to each of the at least two participants in the video conference that are connected to the multicast engine.

14. The method of claim 13, further comprising:
performing a mixing algorithm, using the second processor of the server station, that determines which video streams of the plurality of conference participants to include in the conference video stream for a plurality of mix cycles; and
transmitting a signal to the multicast engine that the first video stream is to be included in the conference video stream in a new cycle based on the mixing algorithm when the first video stream was not mixed to form the conference video stream in a previous cycle.

15. The method of claim 14, further comprising:
an input to the mixing algorithm being a voice activity detection signal.

16. The method of claim 14, further comprising:
the signal being a NACK signal.

17. The method of claim 16, further comprising:
transmitting, to the multicast engine from the server station, identifiers of the video streams of those of the plurality of conference participants to be included in the conference video stream in a first cycle after the new cycle based on the mixing algorithm; and
ending transmission, by the multicast engine, of any video stream of the at least two participants that is not included in the identifiers.

18. The method of claim 17, further comprising:
the identifiers belonging to a contributing source list; and
a connected participant supplying the first video stream being in the contributing source list when a synchronization source identifier of the connected participant is included in the contributing source list.

19. The method of claim 13, further comprising:
estimating an input into a mixing algorithm that determines which video streams of the at least two participants connected to the multicast engine are candidates for the conference video stream.

20. The method of claim 19, further comprising:
estimating the input by biasing the mixing algorithm to select at least one connected participant of the at least two participants.

* * * * *